Figures 1, 2:
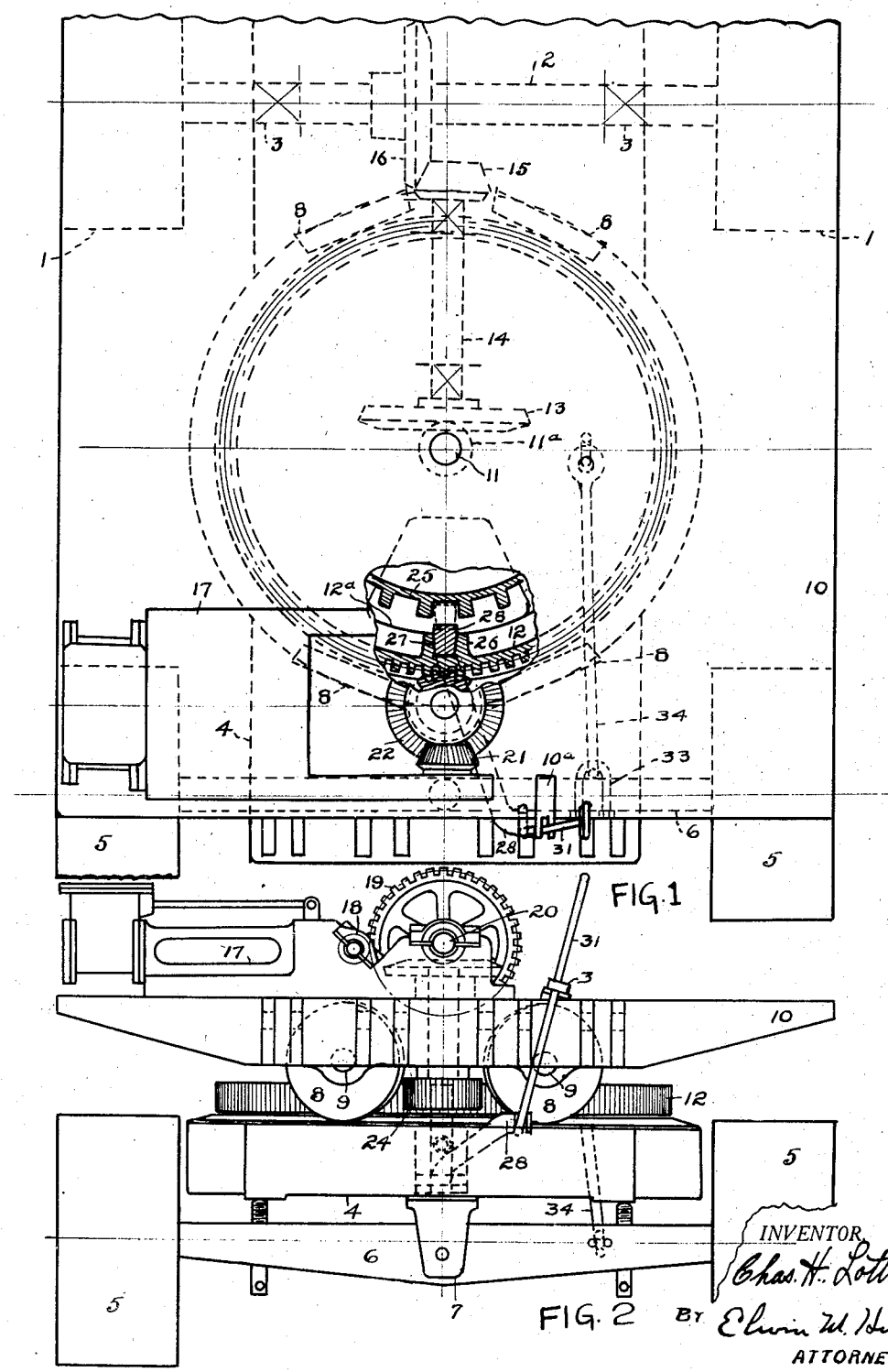

July 6, 1926.

C. H. LOTTE 1,591,044

STEERING MECHANISM FOR ROTATING POWER MACHINES

Filed Dec. 17, 1923    5 Sheets-Sheet 1

INVENTOR
Chas. H. Lotte
By Elwin M. Hulse
ATTORNEY

July 6, 1926.
C. H. LOTTE
1,591,044
STEERING MECHANISM FOR ROTATING POWER MACHINES
Filed Dec. 17, 1923  5 Sheets-Sheet 2
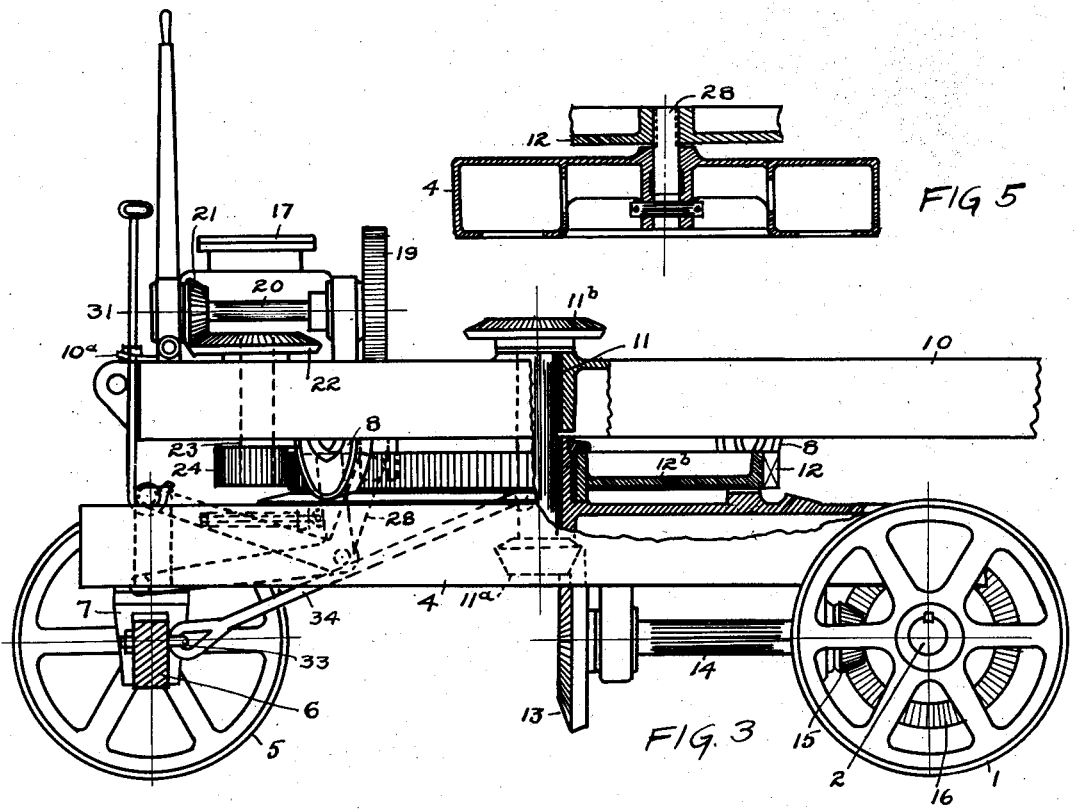
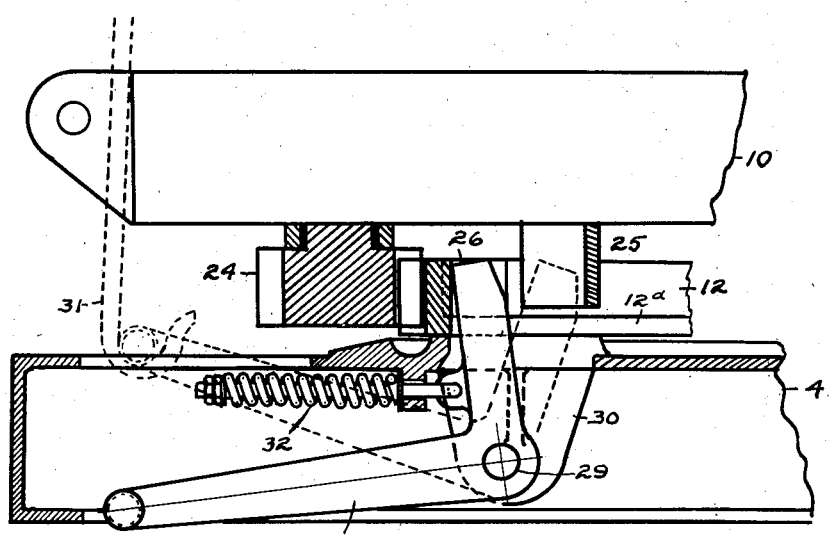
INVENTOR.
Chas. H. Lotte.
BY
ATTORNEY.

July 6, 1926.

C. H. LOTTE 1,591,044

STEERING MECHANISM FOR ROTATING POWER MACHINES

Filed Dec. 17, 1923   5 Sheets-Sheet 3

INVENTOR.
Chas. H. Lotte
BY
Elwin M. Hulse
ATTORNEY.

July 6, 1926.
C. H. LOTTE
1,591,044
STEERING MECHANISM FOR ROTATING POWER MACHINES
Filed Dec. 17, 1923    5 Sheets-Sheet 4
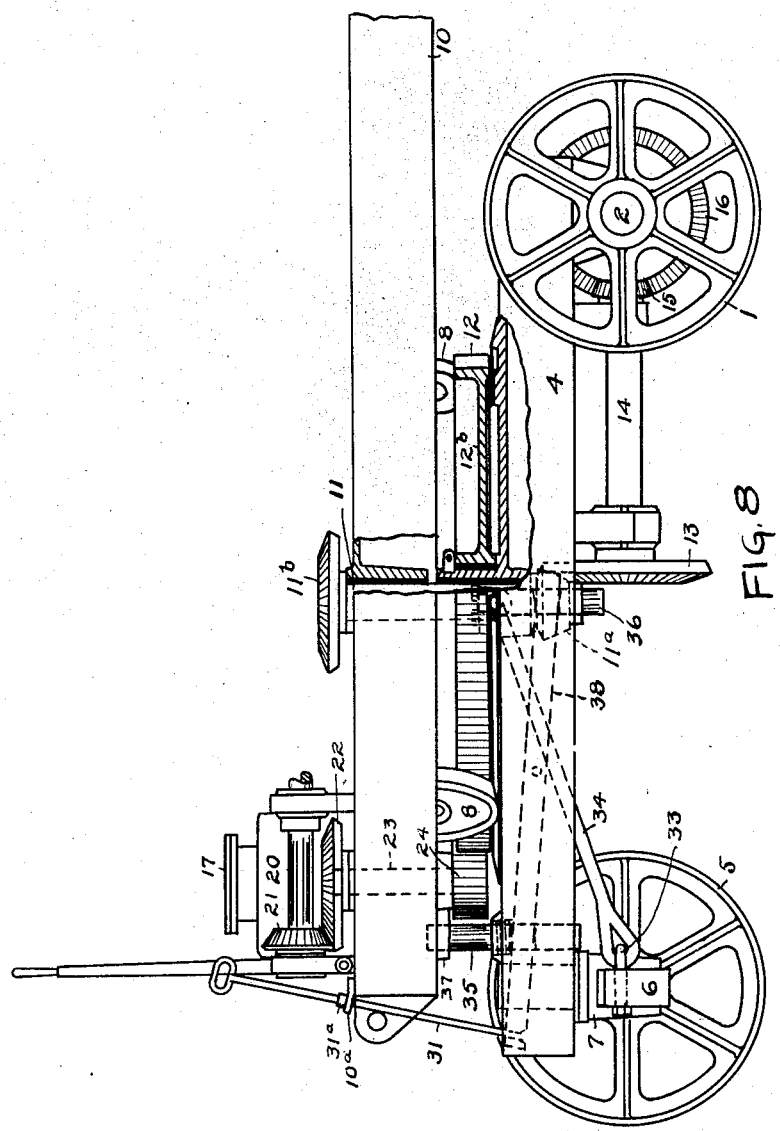
INVENTOR.
Chas. H. Lotte
BY
ATTORNEY.

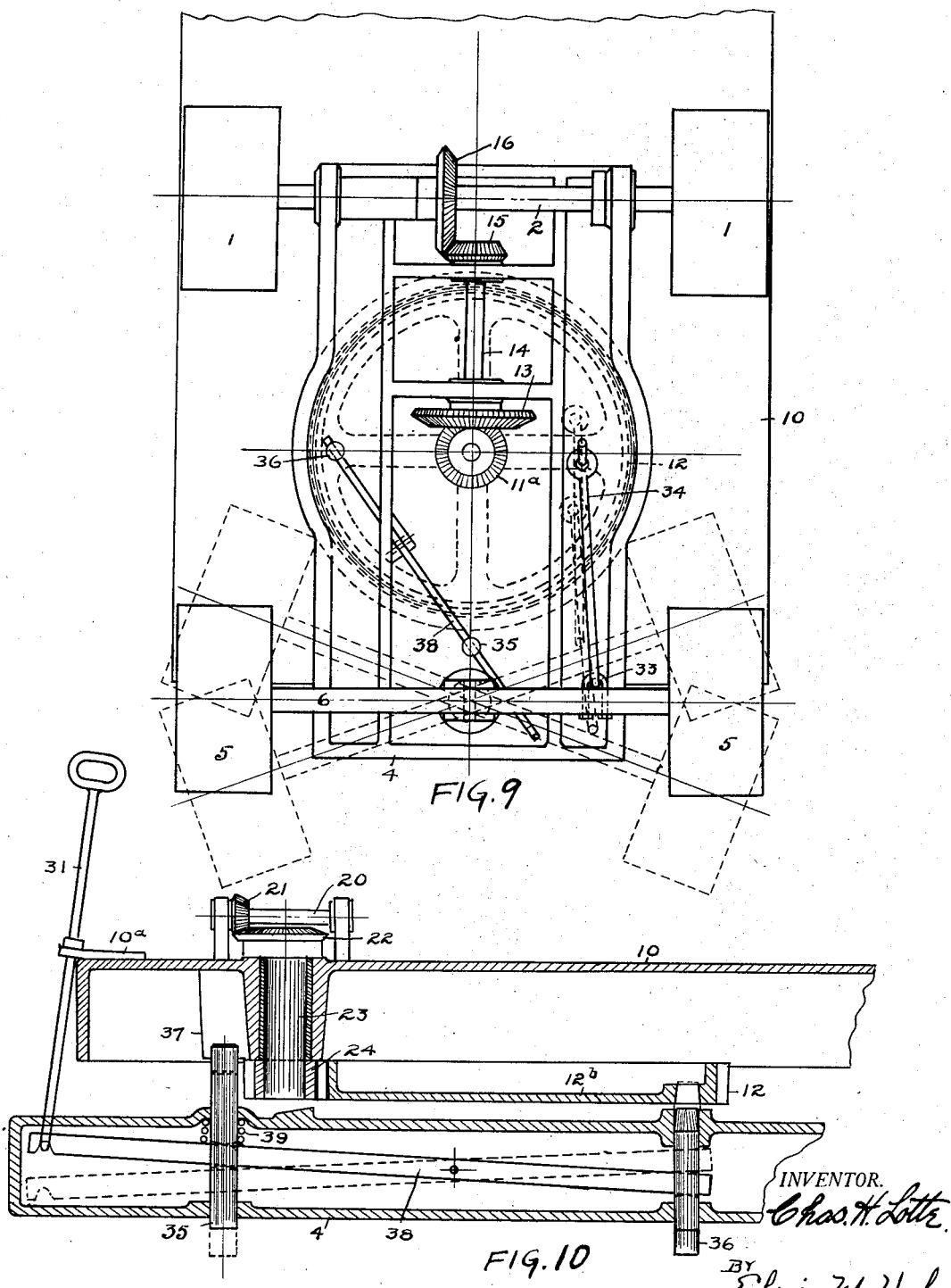

Patented July 6, 1926.

1,591,044

UNITED STATES PATENT OFFICE.

CHARLES H. LOTTE, OF FORT WAYNE, INDIANA.

STEERING MECHANISM FOR ROTATING POWER MACHINES.

Application filed December 17, 1923. Serial No. 681,058.

The invention relates to steering mechanisms for power machines, especially for excavating machines or cranes wherein the excavating or crane machinery is supported on a platform that is rotatably mounted on a wheeled or caterpillar truck.

In machines of the type described it is desirable that the power producing mechanism on the platform shall be used for accomplishing the steering of the machine as it is propelled over the ground. A common method of steering such machines is to connect the steering axle of the wheeled type, or the clutches of the well known endless traction belt type, to the rotatable body or platform and by the movement of that body accomplish the desired steering movement. Among the disadvantages of such a method are the loss of time in making the necessary steering connections, the difficulty of rotating the body in cramped quarters, and, in the wheeled type, of no means of positively locking the steering axle to the truck frame to avoid swiveling movement of the axle when the excavating bucket is thrust into the work.

The object of my invention is to provide a machine with a simple, strong and durable means for steering the truck by which the above mentioned disadvantages, among others well known to those experienced in the operation of this type of machine, are avoided.

My invention consists in the novel combination and arrangement of parts hereinafter described, an embodiment of which is illustrated in the drawings in which I have shown the invention applied to a rotary power shovel of well known type; but it is understood that I do not intend thereby to limit the invention to such application, since it is applicable to portable machines of various kinds wherein swinging movements may be utilized to steer the same.

In the drawings—

Figure 6:
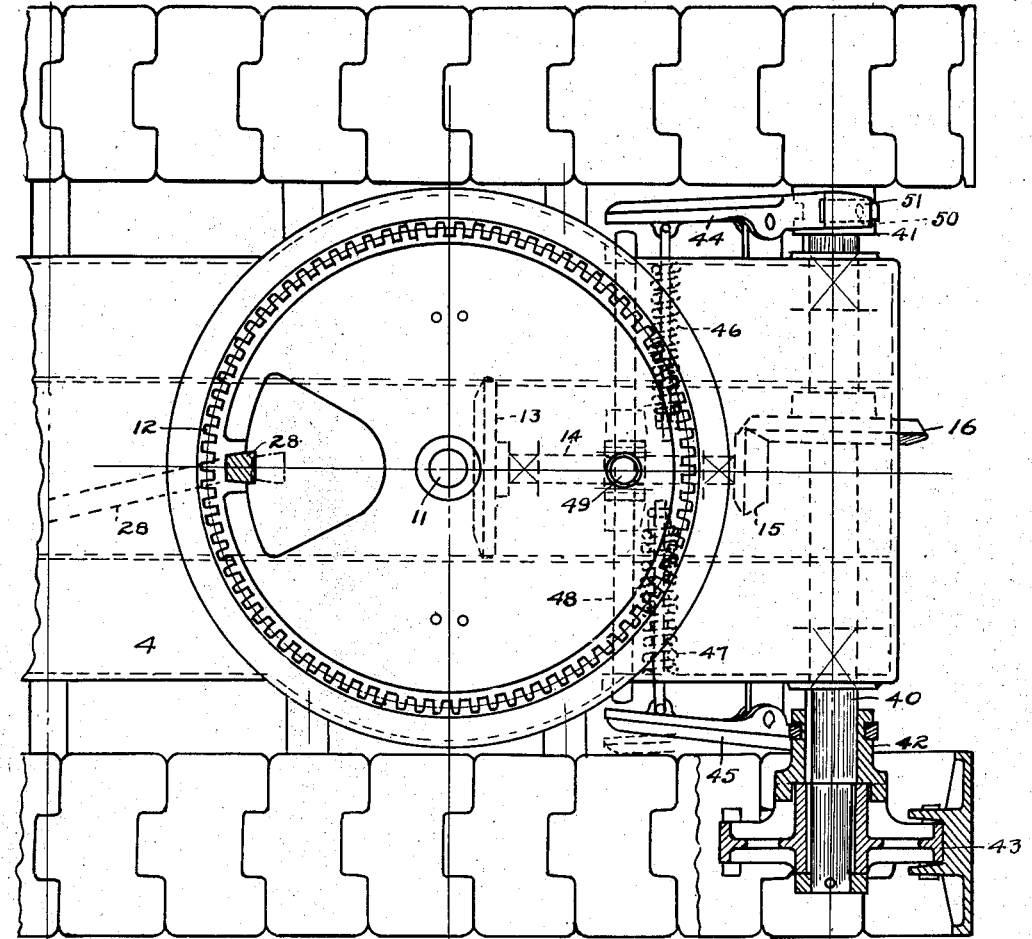
Figure 7:
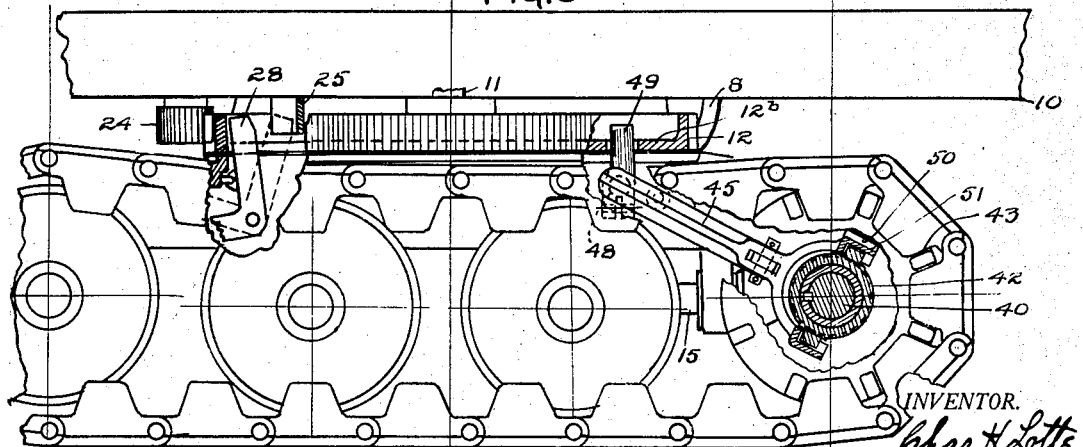

Figure 1 is a plan view of a wheeled truck with parts of its deck broken away, and having the invention applied thereto; Fig. 2 an end elevational view of the same; Fig. 3 a side elevational view of the same; Fig. 4 a fractional side elevational view of the truck illustrating the locking means; Fig. 5 a cross-sectional view of the frame illustrating the locking lever in engagement with the swinging gear; Fig. 6 a plan view of a modified form of truck having the invention applied thereto; Fig. 7 a side elevational view of the same; Fig. 8 is a side elevational view of a truck illustrating a modified form of the locking mechanism; Fig. 9 a bottom plan view of the same; Fig. 10 a longitudinal sectional view of the truck shown in Fig. 9 and Fig. 11 is a detail view of a lock shifting arm.

Referring first to Figs. 1 to 4 of the drawings, the propelling wheels 1 are mounted on an axle 2 journalled in the bearings 3 carried on the under side of the truck frame 4. At the opposite end of the frame are the steering wheels 5 mounted on an axle 6, which is pivoted at its central point to a trunnion 7 suitably carried by the frame 4.

A suitable number of rollers 8, preferably conical in shape, are revolubly mounted on the shafts 9 and support the swinging deck 10, that is rotatably mounted on a pintle 11 that projects upwardly through the frame 4 and the deck and forms the axis of an annular gear 12 that is revolubly mounted thereon. A bevel pinion 11$^a$ is secured to the lower end of the pintle and meshes with a bevel gear 13 mounted on one end of a shaft 14 suitably mounted on the frame. A bevel pinion 15 at the opposite end of the shaft 14 is in mesh with a bevel gear 16 secured to the propelling axle 2. A gear 11$^b$ is on the upper end of the pintle 11 and a suitable or selected source of power is connected to the gear or adapted to be connected to it.

Any suitable or selected form of power mechanism or prime mover, such as the engine 17, is mounted on the deck. A spur pinion 18 on the crank shaft of the mechanism 17 engages a spur gear 19 mounted on an intermediate shaft 20, upon which shaft is also mounted a bevel pinion 21 in mesh with a bevel gear 22 mounted on a vertical shaft 23. A spur pinion 24 on the lower end of the shaft 23 engages the gear 12. Hence, when the spur pinion 18 is rotated by the prime mover, the spur pinion 24 is also rotated, and, when the gear 12 is locked to the frame 4 as hereafter described, it necessarily follows that the deck is caused to rotate or oscillate in a horizontal plane about the pintle 11.

A segment gear or rack 25 of suitable length is secured to and depends from the lower side of the deck and lies within the gear 12 and is concentric therewith. At a selected point on the inner periphery of the gear 12 is formed a lug 26 having a transversely tapered recess or key-way 27 therein adapted to receive the upper end of a bell crank locking lever 28 that is pivoted at 29 to a bracket 30 secured to or integral with the truck frame. The said upper end of the lever is tapered and is also adapted to be received between any two of the teeth of the rack 25. The opposite arm of the lever 28 is projected forwardly sufficiently to permit of access to it by a suitable operating member, such as the hook 31, by which the lever may be rocked on its pivot, by the operator while on the deck, to cause its upper end to engage the rack 25 and lock the deck to the truck frame. A collar 31ª on the member 31 is engaged on a suitable bracket 10ª secured to the deck 10 and thereby holds the lever 28 in its rocked position. Any suitable means for operating the lever that is operable preferably from the deck will suffice.

When the member 31 is released from the bracket 10ª the spring 32 restores the lever into engagement with the recessed lug 26, and the deck is free to be rotated or swung on the frame. If the recess 27 should be out of alinement with the key portion of the lever, the latter will abut the edge 12ª of the gear 12, the gear will be rotated by the power mechanism 17 sufficiently to move the recess 27 into proper alinement with the lever whereupon the spring 32 will automatically engage the lever in the recess 27. The tapering key-way 27 and the correspondingly tapered key portion of the lever 28 are advantageous in compensating the wear of the said portion of the lever, and of the walls of the key-way, and in providing a quick engagement of the said portion in the recess and ready disengagement of the same.

The provision of a plurality of teeth for the rack 25 is also an advantage since it is often desirable to avoid obstructions in propelling the machine, such as in turning corners where the appliances, particularly the boom, mounted on the deck might strike trees and the like. At such times the locking lever will be released from the gear 25 and engaged in the lug 26 to lock the gear 12 to the truck frame, and the pinion 24 will be rotated to swing the deck sufficiently in proper direction to cause the appliances to avoid the obstructions, after which the gear 12 is again released from the deck truck frame and the steering operations continued, the deck being first restored to its alined position with the truck if such is desirable.

A clevis 33 is secured at a suitable point to the steering axle 6 and a rod or link 34 is connected at one end to the clevis. The opposite end of the rod is adapted to be connected to the lower face or web 12ᵇ of the gear 12.

With the lever 28 normally engaged in the recessed lug 26 the gear 12 is locked to the truck frame and hence can not move when the pinion 24 is rotated; the deck, therefore, is rotated when the gear 12 is locked to the frame. At the same time, since the rod or link 34 connects the steering axle to the gear 12, the axle is held practically rigid and the steering wheels will not change their position relatively to the truck frame as the deck is swung back and forth. When it is desired to move the machine the lever 28 is disengaged from the recessed lug and engaged in the rack 25, the deck being rotated to cause the space between two adjacent teeth of the rack to line up with the recess in the lug 26. The lever 28 thus releases the gear 12 and locks the deck to the truck frame. When the pinion 24 is rotated in either direction the gear 12 is rotated causing the link or rod 34 to swing the steering axle in either direction, and thereby steer the machine as it is propelled.

In Figs. 8, 10 and 11, I omit the rack 25 and the recessed lug on the gear, and mount two vertically movable pins 35 and 36 in the truck frame. The upper end of the pin 35 is adapted to be engaged in an apertured lug 37 on the deck and the upper end of the pin 36 is adapted to be passed into or through an aperture in the web 12ᵇ of the gear 12. A lever 38 is pivoted to the truck frame between the pins and is suitably connected to the pins. A spring 39 encircling the pin 35 tends to depress the adjacent arm of the lever 38 causing the lever to elevate the pin 36 to connect the gear 12 to the truck frame and release the pin 35 from the deck. It is evident that when the hook 31 is engaged on the outer end of the lever and pulled upwardly that the lever will cause the pin 35 to engage the deck and withdraw the pin 36 from the gear 12 so that the gear 12 may be swung or oscillated to swing the steering axle for steering purposes.

In Figs. 6 and 7, I illustrate the application of the invention to another type of truck, wherein 40 indicates the driving axle suitably revolubly mounted on the frame of the truck. The clutches 41 and 42 are slidably mounted on the axle and are adapted to lock the driving members 43 to the shaft in the usual manner. The levers 44 and 45 are connected to the clutches respectively and the springs 46 and 47 normally hold the clutches in engagement with the members 43 for connecting the propelling axle 40 to the driving members to propel the machine.

Between the free ends of the levers 44 and 45 is a longitudinally movable bar or member 48 having a pivoted connection to a pin 49 normally engaged in an aperture in the web 12ᵇ of the gear 12. The lever 28 is similar to and operates in the same manner to lock the gear 12 to the truck frame or to lock the deck to the truck frame as the lever 28 in Figs. 1 to 4. When the lever 28 is released from the gear 12 and is engaged in the rack 25 and the pinion 24 is rotated, the gear 12 is rotated or swung and the pin 49 is moved thereby reciprocating the member 48 in proper direction to engage and rock lever 44 or 45 and disengage the clutch 41 or 42 thereby releasing the selected driving member 43 to cause the other member to steer the machine in the usual manner.

An aperture 50 may be formed in each of the trunnion members 51 for the reception of a suitable bar by which to throw out or in either clutch in the event the steering mechanism should, for any reason, fail to operate, the springs 46 or 47 being disconnected from the clutch.

It is thus seen that by rotatably mounting the annular gear on the truck frame, I am enabled either to swing the platform or to steer the machine by shifting the locking member from the platform. The operator of the machine is therefore enabled to accomplish both said operations without leaving the platform and thereby making a great saving in time and labor.

What I claim is:

1. A truck, a steering mechanism on the truck, a deck pivotally mounted on the truck, a power driven pinion supported by the deck, an annular gear rotatably mounted on the truck and in mesh with the pinion, means operatively connecting the gear and the steering mechanisms, a key-way on the gear, a rack on the deck opposing the key-way and a lever pivotally mounted on the truck and adapted to be engaged in either the key-way or the rack for locking the gear to the truck or the deck to the truck.

2. In combination, a truck, a steering mechanism mounted on the truck, a deck mounted on the truck to swing in angular relation thereto, power means carried by the deck and movable therewith, a gear driven by said power means and mounted on the truck, means operatively connecting the gear and steering mechanism and means for selectively locking the gear or deck to the truck.

3. In combination, a truck, a steering mechanism mounted on the truck, a deck mounted on the truck to swing in angular relation thereto, power means carried by the deck and movable therewith, a gear driven by said power means and mounted on the truck, means operatively connecting the gear and steering mechanism and means for selectively locking the gear or deck to the truck, said means including a lever fulcrumed on the truck and adapted for selective engagement with the gear or deck.

In witness whereof I have hereunto subscribed my name this 14th day of December, 1923.

CHARLES H. LOTTE.